US011112649B1

(12) United States Patent
Zhao (10) Patent No.: US 11,112,649 B1
(45) Date of Patent: Sep. 7, 2021

(54) BACKLIGHT MODULE AND DISPLAY DEVICE

(71) Applicant: TCL CHINA STAR OPTOELECTRONICS TECHNOLOGY CO., LTD., Guangdong (CN)

(72) Inventor: Jinyang Zhao, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 16/956,649

(22) PCT Filed: May 14, 2020

(86) PCT No.: PCT/CN2020/090319
§ 371 (c)(1),
(2) Date: Jun. 22, 2020

(30) Foreign Application Priority Data

Apr. 10, 2020 (CN) .......................... 202010276939.6

(51) Int. Cl.
*G02F 1/13357* (2006.01)
*G02F 1/1335* (2006.01)

(52) U.S. Cl.
CPC .. *G02F 1/133603* (2013.01); *G02F 1/133605* (2013.01); *G02F 1/133606* (2013.01); *G02F 1/133607* (2021.01); *G02F 1/133614* (2021.01)

(58) Field of Classification Search
CPC ......... G02F 1/133606; G02F 1/133614; G02F 1/133603; G02F 1/133607; G02F 1/133605
See application file for complete search history.

(56) References Cited

U.S. PATENT DOCUMENTS

| 10,338,300 | B2* | 7/2019 | You ...................... G02B 6/0053 |
| 10,353,223 | B2* | 7/2019 | Kim .................. G02F 1/133602 |
| 2009/0101930 | A1* | 4/2009 | Li .............................. F21K 9/64 |
| | | | 257/98 |
| 2016/0154162 | A1* | 6/2016 | Cheng .................... G02B 6/005 |
| | | | 362/607 |
| 2016/0377786 | A1* | 12/2016 | Ham ................. G02F 1/133603 |
| | | | 349/65 |
| 2018/0081096 | A1* | 3/2018 | Claes ................ G02F 1/133514 |
| 2018/0138027 | A1* | 5/2018 | Oku ........................ H01J 61/44 |
| 2019/0097097 | A1* | 3/2019 | Ko ....................... H01L 25/0753 |
| 2019/0251897 | A1* | 8/2019 | Toyama ................. B82Y 20/00 |

FOREIGN PATENT DOCUMENTS

| CN | 202274346 U | 6/2012 |
| CN | 105223641 A | 1/2016 |
| CN | 106842704 A | 6/2017 |
| CN | 208444859 U | 1/2019 |
| CN | 110591449 A | 12/2019 |
| TW | 201243438 A | 11/2012 |

* cited by examiner

*Primary Examiner* — Erin Kryukova
(74) *Attorney, Agent, or Firm* — Mark M. Friedman (57) ABSTRACT

A backlight module and a display device are provided. A blue laser is emitted by a light emitting unit of the backlight module, and a red laser generator and a green laser generator included in the laser array with an optical echo-wall mode microcavity are disposed on the light-emitting unit, so that the backlight formed by the laser array has a larger viewing angle and higher backlight uniformity.

20 Claims, 5 Drawing Sheets

BACKLIGHT MODULE AND DISPLAY DEVICE

BACKGROUND OF INVENTION

Field of Invention

The present invention relates to the field of display technology, and more particularly, to a backlight module and a display device.

Description of Prior Art

With the development of display technology, laser display technology is gradually applied to display devices due to its advantages of wide color gamut, high color saturation, energy saving, environmental protection, and long service life. In the laser display technology, laser backlight modules can directly affect the display effect of the display devices.

However, backlight uniformity provided by the laser backlight module is poor, and the viewing angle is less, resulting in a poor display effect of the display devices.

SUMMARY OF INVENTION

Currently, backlight uniformity provided by the laser backlight module is poor, and the viewing angle is less, resulting in a poor display effect of the display devices.

A backlight module includes:
a light-emitting unit;
a laser array disposed on the light-emitting unit, and the laser array comprises a red laser generator and a green laser generator, and the red laser generator and the green laser generator comprise an optical echo-wall mode microcavity;
a prism sheet disposed on the laser array; and
a diffusion sheet disposed on the prism sheet; and the light-emitting unit is configured to emit a blue laser and irradiates the red laser generator and the green laser generator with the blue laser, the red laser generator and the green laser generator excite the red laser and the green laser, and the red laser, the blue laser, and the green laser are mixed by the prism sheet and the diffusion sheet to emit a white laser.

In one embodiment, the red laser generator and the green laser generator are disposed alternately, or the red laser generator and the green laser generator are stacked on each other.

In one embodiment, the green laser generator is disposed on the red laser generator when the red laser generator and the green laser generator are stacked on each other.

In one embodiment, a red laser material and a green laser material are sequentially deposited on a transparent substrate to obtain a two-color laser film by the red laser generator and green laser generator stacked on each other, and the two-color laser film is formed by etching.

In one embodiment, the red laser generator and the green laser generator comprise an organic dye-doped polymer material and an inorganic semiconductor laser material.

In one embodiment, the red laser generator and the green laser generator disposed alternately are formed by an inkjet printing.

In one embodiment, the red laser generator and the green laser generator comprise a solution-processable organic laser material and a perovskite material.

In one embodiment, the red laser generator and the green laser generator comprise a micro-disk optical resonant cavity structure or a micro hemispherical optical resonant cavity structure.

In one embodiment, the light-emitting unit comprises a blue laser generator and a light guide plate, and the blue laser generator is disposed on a side of the light guide plate, or the light-emitting unit is a blue laser generator.

In one embodiment, the backlight module further comprises a reflective sheet, and the reflective sheet is disposed on a side of the light-emitting unit away from the laser array.

A display device includes:
a display module; and
a backlight module disposed on the display module, and the backlight module comprises a light-emitting unit, a laser array, a prism sheet, and a diffusion sheet. The laser array is disposed on the light-emitting unit, and the laser array comprises a red laser generator and a green laser generator, and the red laser generator and the green laser generator comprise an optical echo-wall mode microcavity. The prism sheet is disposed on the laser array. The diffusion sheet is disposed on the prism sheet. The light-emitting unit is configured to emit a blue laser and irradiates the red laser generator and the green laser generator with the blue laser, the red laser generator and the green laser generator excite the red laser and the green laser, and the red laser, the blue laser, and the green laser are mixed by the prism sheet and the diffusion sheet to emit a white laser.

In one embodiment, the red laser generator and the green laser generator are disposed alternately, or the red laser generator and the green laser generator are stacked on each other.

In one embodiment, the green laser generator is disposed on the red laser generator when the red laser generator and the green laser generator are stacked on each other.

In one embodiment, red laser material and green laser material are sequentially deposited on a transparent substrate to obtain a two-color laser film by the red laser generator and green laser generator stacked on each other, and the two-color laser film is formed by etching.

In one embodiment, the red laser generator and the green laser generator comprise an organic dye-doped polymer material and an inorganic semiconductor laser material.

In one embodiment, the red laser generator and the green laser generator disposed alternately are formed by an inkjet printing.

In one embodiment, the red laser generator and the green laser generator comprise a solution-processable organic laser material and a perovskite material.

In one embodiment, the red laser generator and the green laser generator comprise a micro-disk optical resonant cavity structure or a micro hemispherical optical resonant cavity structure.

In one embodiment, the light-emitting unit comprises a blue laser generator and a light guide plate, and the blue laser generator is disposed on a side of the light guide plate, or the light-emitting unit is a blue laser generator.

In one embodiment, the backlight module further comprises a reflective sheet, and the reflective sheet is disposed on a side of the light-emitting unit away from the laser array.

Accordingly, the backlight module includes a light-emitting unit, a laser array, a prism sheet, and a diffusion sheet. The laser array is disposed on the light-emitting unit. The laser array includes a red laser generator and a green laser generator. The red laser generator and the green laser generator include an optical echo-wall mode microcavity. The prism sheet is disposed on the laser array. The diffusion sheet is disposed on the prism sheet. The light-emitting unit is configured to emit a blue laser and irradiates the red laser generator and the green laser generator with the blue laser, and the red laser generator and the green laser generator excite red laser and green laser. The red laser, the blue laser, and the green laser can be mixed by the prism sheet and the diffusion sheet to form a white laser. Therefore, the uniformity of the backlight of the backlight module is improved.

The present invention has beneficial effects described as follows. The backlight module includes a light-emitting unit, a laser array, a prism sheet, and a diffusion sheet. The laser array is disposed on the light-emitting unit. The laser array includes a red laser generator and a green laser generator. The red laser generator and the green laser generator include an optical echo-wall mode microcavity. The prism sheet is disposed on the laser array. The diffusion sheet is disposed on the prism sheet. The light-emitting unit is configured to emit a blue laser and irradiates the red laser generator and the green laser generator with the blue laser, and the red laser generator and the green laser generator excite red laser and green laser. The red laser, the blue laser, and the green laser can be mixed by the prism sheet and the diffusion sheet to form a white laser. Therefore, the uniformity of the backlight of the backlight module is improved.

BRIEF DESCRIPTION OF DRAWINGS

In order to more clearly illustrate the technical solutions in the embodiments, the drawings described in the description of the embodiments are briefly described below. It is obvious that the drawings in the following description are only some embodiments of the present invention. Other drawings can also be obtained from those skilled persons in the art based on drawings without any creative effort.

DETAILED DESCRIPTION OF PREFERRED EMBODIMENTS

The technical solutions in the embodiments of the present application will be described clearly and completely in conjunction with the drawings in the embodiments of the present application. Obviously, the described embodiments are only a part of the embodiments of the present application, but not all the embodiments. Based on the embodiments in the present application, all other embodiments obtained by those skilled in the art without making creative work fall within the claimed scope of the present application.

In one embodiment, a backlight module and a display device are provided and described in detail below.

Figure 1:
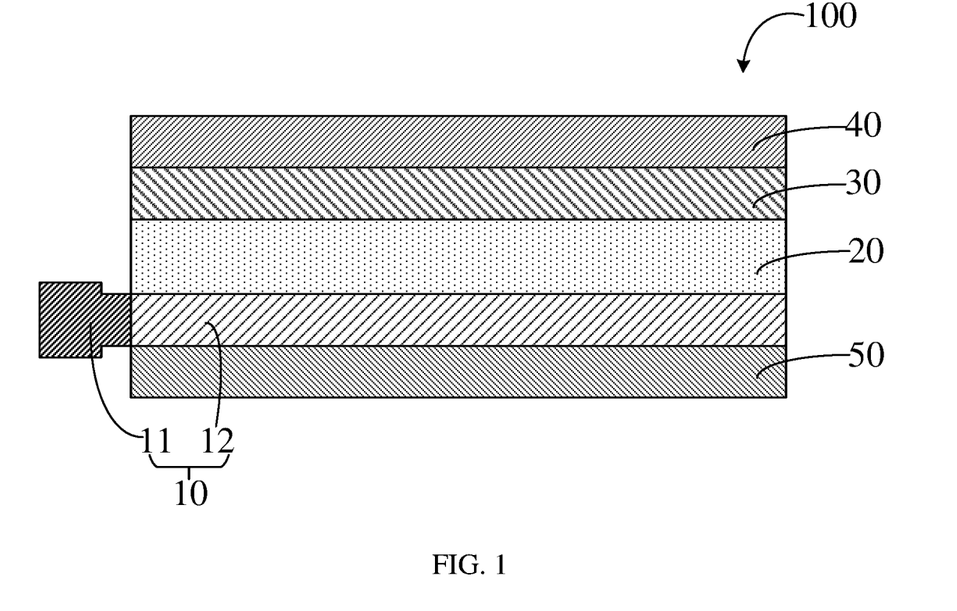
FIG. 1 is a schematic structural view of a backlight module according to one embodiment of the present invention.

Referring to FIG. 1, it is a schematic structural view of a backlight module according to one embodiment of the present invention. The backlight module 100 includes a light-emitting unit 10, a laser array 20, a prism sheet 30, and a diffusion sheet 40.

The light-emitting unit 10 is configured to emit a blue laser. It should be noted that when the backlight module 100 is an edge-lit backlight module, the light-emitting unit 10 includes a blue laser generator 11 and a light guide plate 12.

Figure 2:
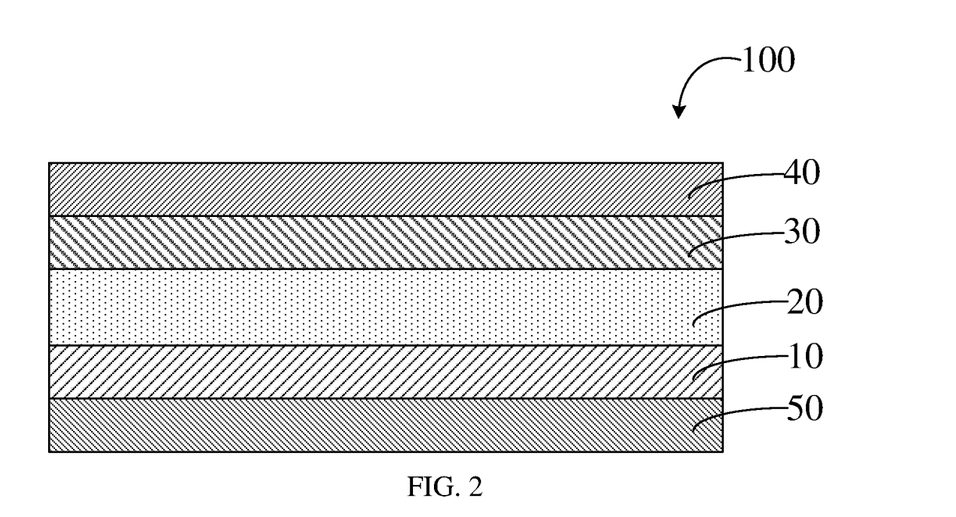
FIG. 2 is another schematic structural view of the backlight module according to one embodiment of the present invention.

The blue laser generator 11 is disposed on a side of the light guide plate 12. When the backlight module 100 is a direct-type backlight module, the light-emitting unit 10 may be a blue laser generator, as shown in FIG. 2.

Figure 3:
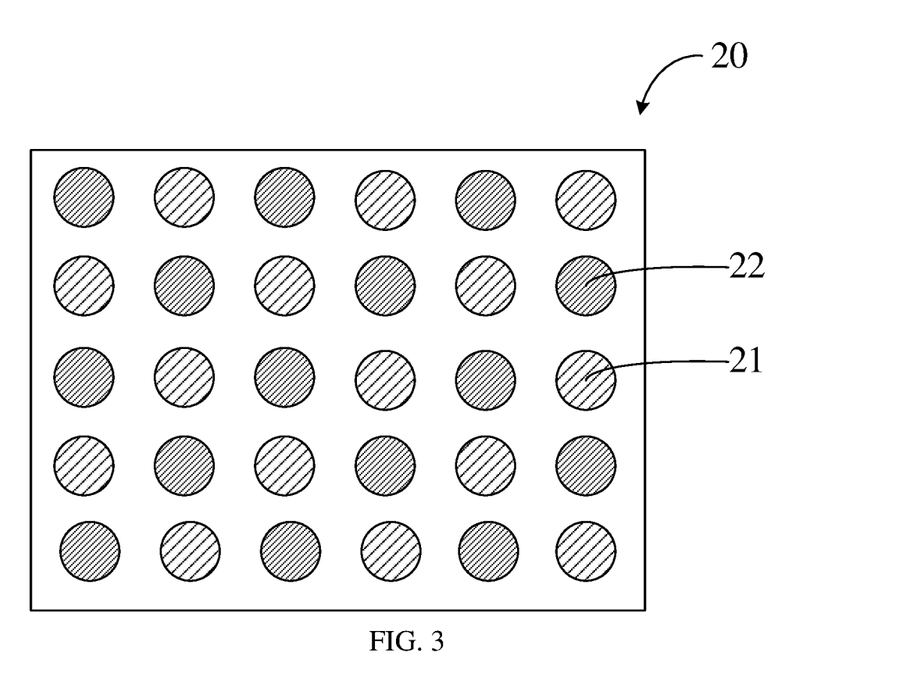
FIG. 3 is a schematic structural view of a laser array according to one embodiment of the present invention.
Figure 4:
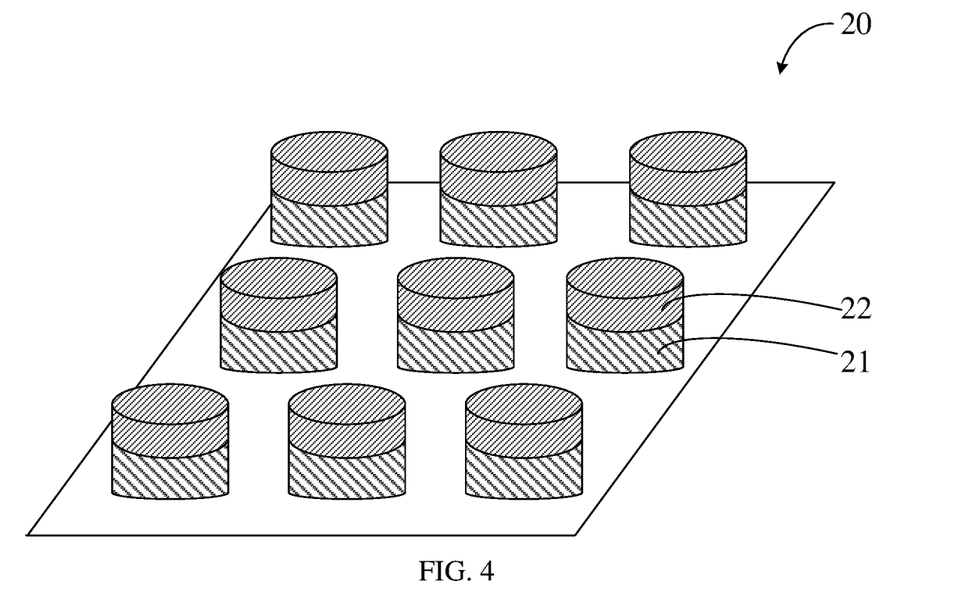
FIG. 4 is another schematic structural view of the laser array according to one embodiment of the present invention.

The laser array 20 is disposed on the light-emitting unit 10. In some embodiments, as shown in FIG. 3 or FIG. 4, the laser array 20 includes a red laser generator 21 and a green laser generator 22. It should be noted that the red laser generator 21 and the green laser generator 22 include an optical echo-wall mode microcavity.

The red laser generator 21 and the green laser generator 22 include laser dyes such as coumarins, rhodamines, cyanines, and azines, semiconductor materials of inorganic III-V materials, and laser materials or laser crystals such as quantum dots, all-inorganic perovskites, and organic and inorganic hybrid perovskites, etc.

It should be noted that the echo-wall mode originates in the field of acoustics. Its principle is that sound waves can be continuously reflected on curved and smooth walls with low energy loss, so sound can be transmitted across long distances along the wall, which is called whispering gallery mode (WGM), that is, the echo-wall mode. Similar to the reflection of sound waves on the wall surface, when light is incident from more dense to less dense mediums and the angle of incidence is large enough, total reflection can also occur on the surface of the two mediums. Then, there is also an optical echo-wall mode at the interface of the curved high refractive index medium. Within the boundary of the closed cavity, light can always be confined within the cavity to maintain a stable traveling wave transmission mode, that is, light energy loss is low.

It should be noted that the microcavity refers to an optical resonant cavity with a high-quality factor and a size on the scale of micrometers. Since the quality factor of the microcavity is very high, for example, the quality factor can reach an order of $10^8$, the mechanical mode of the microcavity can be activated at a lower power. That is, in the embodiment of the present invention, the red laser generator 21 and the green laser generator 22 can emit a red laser and a green laser under the excitation of a lower-power blue laser.

Therefore, the optical microcavity structure having the optical echo-wall mode adopted by the red laser generator 21 and the green laser generator 22 in the embodiment of the present invention has the advantages of combination of the echo-wall mode and the optical microcavity structure. That is, the red laser generator 21 and the green laser generator 22 can emit the red laser and the green laser under the excitation of the lower-power blue laser, and maintain a larger laser intensity.

In some embodiments, in order to increase the laser emission angle of the red laser generator 21 and the green laser generator 22, the viewing angle of the backlight module 100 is increased. The red laser generator 21 and the green laser generator 22 include a micro-disk optical resonant cavity structure or a micro-hemispherical optical resonant cavity structure.

In some embodiments, the laser emission angles of the red laser generator 21 and the green laser generator 22 are large, so in order to improve the backlight uniformity of the backlight module 100, several red laser generators 21 and several green laser generators 22 may be arranged in an array to form a large-scale laser array 20. Specifically, as shown in FIG. 3, the red laser generator 21 and the green laser generator 22 are disposed alternately, or as shown in FIG. 4, the red laser generator 21 and the green laser generator 22 are stacked on each other.

It should be noted that when the red laser generator 21 is disposed on the green laser generator 22, the green laser generator 22 is excited to emit a green laser by the blue laser emitted from the light-emitting unit 10. Most of the green laser absorbs laser emitted from the red laser generator 21, thereby increasing laser energy loss. When the green laser generator 22 is disposed on the red laser generator 21, the red laser generator 21 is excited by the blue laser emitted from the light-emitting unit 10 to emit a red laser. Therefore, the green laser 22 has little absorption of the red laser.

Therefore, in the embodiment of the present invention, in order to reduce the absorption of the green laser emitted from the green laser 22 by the red laser 21, the green laser 22 may be disposed on the red laser generator 21.

In one embodiment, the red laser generator 21 and the green laser generator 22 are disposed alternately to form a laser array 20 by an inkjet printing. The red laser generator 21 and the green laser generator 22 include a solution-processable organic laser material and a perovskite material.

In one embodiment, a red laser material and a green laser material are sequentially deposited on a transparent substrate to obtain a two-color laser film by the red laser generator 21 and green laser generator 22 stacked on each other to form a laser array. Then, photolithography, electron beam etching or ion beam etching is used to etch the two-color laser film. At this time, the red laser generator 21 and the green laser generator 22 include an organic dye-doped polymer material and an inorganic semiconductor laser material.

In one embodiment, a diameter of the red laser generator 21 and the green laser generator 22 may be 10-100 microns. It should be noted that when sizes of the red laser generator 21 and the green laser generator 22 are smaller, the number of laser modes supported by the red laser generator 21 and the green laser generator 22 is lesser. When the sizes of the red laser generator 21 and the green laser generator 22 reach a certain limit, a single-mode laser can also be obtained. Therefore, as the sizes of the red laser generator 21 and the green laser generator 22 decrease in size, the spectral purity of the backlight of the backlight module 100 and the range of its color gamut become greater.

In addition, the smaller sizes of the red laser generator 21 and the green laser generator 22, the more red laser generators 21 and green laser generators 22 are included in the laser array 20. The more red laser generators 21 and green laser generators 22 there are, the higher the backlight uniformity of the backlight module 100.

The prism sheet 30 is disposed on the laser array 20. The prism sheet 30 may be one or more transparent plastic films. For example, the prism sheet 30 may include an upper prism sheet and a lower prism sheet. The role of the prism sheet 30 is to improve the viewing angle distribution of the backlight. It can redirect the backlight that has various angles back to an axial angle, that is, the frontal angle, so as to improve the axial brightness without increasing the total output luminous flux.

In one embodiment, the prism sheet 30 changes divergence angles of the blue laser, the red laser, and the green laser, so that the divergence angles of the blue laser, the red laser, and the green laser are the same, thereby mixing the blue laser, the red laser, and the green laser into a white laser.

The diffusion sheet 40 is disposed on the prism sheet 30. The diffusion sheet 40 can atomize the backlight through the refraction and reflection of the scattering particles, concentrate the light emitted from the backlight from a small angle to a front side to improve frontal brightness, and transmit the backlight evenly. At the same time, the diffusion sheet 40 can also protect the prism sheet 30. The base material of the diffusion sheet 40 needs to be selected from a high light transmittance material, and scattering particles are added to the base material to be dispersed in the base material of the diffusion sheet 40. When the backlight passes through the diffusion sheet 40, the backlight continuously passes through two mediums with different refractive indexes. Therefore, leading to the occurrence of refraction, reflection, and scattering phenomena, thereby generating an optical diffusion effect and uniformly transmitting the backlight.

It can be understood that, in the embodiment of the present invention, the prism sheet 30 can make most blue lasers, red lasers, and green lasers mix to form white lasers. However, there may be parts of blue lasers, red lasers, and green lasers that are not mixed to form white lasers. Therefore, the diffusion sheet 40 can also be used to change the divergence angles of the blue laser, the red laser, and the green laser passing through the diffusion sheet 40, and the divergence angles of the blue laser, the red laser, and the green laser are the same, which causes the blue laser, red laser, and green laser to mix to form the white laser. Therefore, the backlight purity of the backlight module 100 is further improved.

In one embodiment, in order to improve the utilization of the blue laser, a reflective sheet 50 may be disposed on a side of the light-emitting unit 10 away from the laser array 20. The reflective sheet 50 may reflect the blue laser directed to the reflective sheet 50 onto the laser array 20 or the light guide plate 12, thereby improving the utilization of the blue laser.

The backlight module 100 according to one embodiment of the present invention emits a blue laser through the light-emitting unit 10, and a laser array 20 having a red laser generator 21 and a green laser generator 22 is disposed on the light-emitting unit 10 and irradiates the red laser generator 21 and the green laser generator 22 with the blue laser to excite red laser and green laser. The red laser, the green laser, and the blue laser can be mixed by the prism sheet 30 and the diffusion sheet 40 to form a white laser, so that the backlight module 100 can emit white backlight.

In the embodiment of the present invention, the backlight module 100 includes a light-emitting unit 10, a laser array 20, a prism sheet 30, and a diffusion sheet 40. The laser array 20 is disposed on the light-emitting unit 10. The laser array 20 includes a red laser generator 21 and a green laser generator 22. The red laser generator 21 and the green laser generator 22 include an optical echo-wall mode microcavity. The prism sheet 30 is disposed on the laser array 20. The diffusion sheet 40 is disposed on the prism sheet 30. In the embodiments of the present invention, a blue laser is emitted by the light-emitting unit 10, and the red laser generators 21 and the green laser generators 22 included in the laser array 20 disposed on the light-emitting unit 10 have optical echo-wall mode microcavities, so that the backlight viewing angle formed by the laser array 20 is large to improve backlight uniformity. Accordingly, the backlight viewing angle and backlight uniformity of the backlight module 100 are improved.

Figure 5:
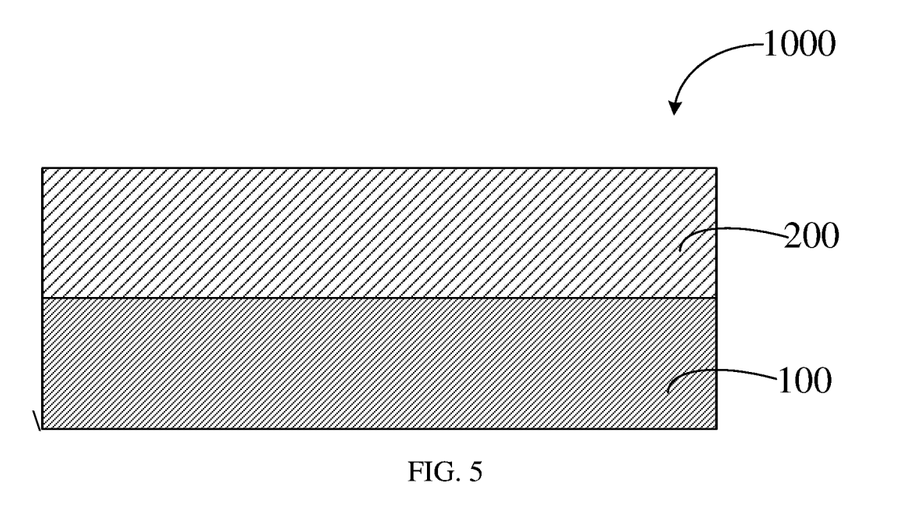
FIG. 5 is a schematic structural view of a display device according to one embodiment of the present invention.

Referring to FIG. 5, it is a schematic structural view of a display device 1000 according to one embodiment of the present invention. The display device 1000 includes a backlight module 100 and a display module 200.

It should be noted that the backlight module 100 is the above-mentioned backlight module in the above embodiments of the present invention.

That is, the backlight module 100 includes a light-emitting unit 10, a laser array 20, a prism sheet 30, and a diffusion sheet 40. The light emitting unit 10 is configured to emit blue laser. The laser array 20 is disposed on the light-emitting unit 10, and the laser array 20 may include a red laser generator 21 and a green laser generator 22. The red laser generator 21 and the green laser generator 22 include optical echo-wall mode microcavities. The prism sheet 30 is disposed on the laser array 20. The diffusion sheet 40 is disposed on the prism sheet 30.

It should be noted that a blue laser is emitted by the light-emitting unit 10, and the red laser generators 21 and the green laser generators 22 included in the laser array 20 disposed on the light-emitting unit 10 have optical echo-wall mode microcavities, When the blue laser irradiates the red laser generator 21 and the green laser generator 22, the red laser and the green laser can be excited. The red laser, the green laser, and the blue laser can be mixed by the prism sheet 30 and the diffusion sheet 40 to form a white laser, thereby making the backlight of the module 100 emit a white backlight.

It should be noted that the laser array 20 includes several red laser generators 21 and green laser generators 22. The red laser generator 21 and the green laser 22 generator are disposed alternately, or the red laser generator 21 and the green laser generator 22 are stacked on each other.

It should be noted that in order to reduce the absorption of the green laser light emitted from the green laser generator 22 by the red laser generator 21, the green laser generator 22 may be disposed on the red laser generator 21.

It should be noted that the red laser generator 21 and the green laser generator 22 according to the embodiments of the present invention include a micro-disk optical resonant cavity structure or a micro hemispherical optical resonant cavity structure.

The display module 200 may include a lower polarizer, an array substrate, a color filter substrate, and an upper polarizer sequentially stacked on the backlight module 100.

It should be noted that the display module 200 includes but is not limited to the above structure, and the display module 200 may also include other structures. For example, liquid crystal layer, frame glue, etc.

Accordingly, a display device 1000 includes a display module 100 and a display module 200. The backlight module includes a light-emitting unit 10, a laser array 20, a prism sheet 30, and a diffusion sheet 40. The light emitting unit 10 is configured to emit blue laser. The laser array 20 is disposed on the light-emitting unit 10, and the laser array 20 includes a red laser generator 21 and a green laser generator 22, and the red laser generator 21 and the green laser generator 22 includes an optical echo-wall mode microcavity. The prism sheet 30 is disposed on the laser array 20. The diffusion sheet 40 is disposed on the prism sheet 30. Accordingly, a blue laser is emitted by the light-emitting unit 10, and the red laser generators 21 and the green laser generators 22 included in the laser array 20 disposed on the light-emitting unit 10 have optical echo-wall mode microcavities, so that the backlight viewing angle formed by the laser array 20 is large to improve backlight uniformity. Therefore, the backlight viewing angle and backlight uniformity of the backlight module 100 are improved, and display effect of the display device 1000 is also improved.

In the above embodiments, the description of each embodiment has its own emphasis. For a part that is not detailed in an embodiment, a person skilled in the art can refer to related descriptions in other embodiments.

The backlight module and display device provided by the embodiments of the present application have been described in detail above. Specific examples are used to explain the principles and implementation of the present application. This article uses specific examples to explain the principles and implementation of the application. The descriptions of the above examples are only used to help understand the technical solutions and core ideas of the application, and those of ordinary skilled persons in the art should understand that they can still modify the technical solutions described in the foregoing embodiments, or equivalently replace some of the technical features, and these modifications or replacements are not deviated from the essence of the corresponding technical solutions of the embodiments of the present application range.

What is claimed is:

1. A backlight module, comprising:
a light-emitting unit;
a laser array disposed on the light-emitting unit, wherein the laser array comprises a red laser generator and a green laser generator, and the red laser generator and the green laser generator comprise an optical echo-wall mode microcavity;
a prism sheet disposed on the laser array; and
a diffusion sheet disposed on the prism sheet;
wherein the light-emitting unit is configured to emit a blue laser and irradiates the red laser generator and the green laser generator with the blue laser, the red laser generator and the green laser generator excite the red laser and the green laser, and the red laser, the blue laser, and the green laser are mixed by the prism sheet and the diffusion sheet to emit a white laser.

2. The backlight module according to claim 1, wherein the red laser generator and the green laser generator are disposed alternately, or the red laser generator and the green laser generator are stacked on each other.

3. The backlight module according to claim 2, wherein the green laser generator is disposed on the red laser generator when the red laser generator and the green laser generator are stacked on each other.

4. The backlight module according to claim 3, wherein a red laser material and a green laser material are sequentially deposited on a transparent substrate to obtain a two-color laser film by the red laser generator and the green laser generator stacked on each other, and the two-color laser film is formed by etching.

5. The backlight module according to claim 4, wherein the red laser generator and the green laser generator comprise an organic dye-doped polymer material and an inorganic semiconductor laser material.

6. The backlight module according to claim 3, wherein the red laser generator and the green laser generator disposed alternately are formed by an inkjet printing.

7. The backlight module according to claim 6, wherein the red laser generator and the green laser generator comprise a solution-processable organic laser material and a perovskite material.

8. The backlight module according to claim 1, wherein the red laser generator and the green laser generator comprise a micro-disk optical resonant cavity structure or a micro hemispherical optical resonant cavity structure.

9. The backlight module according to claim 1, wherein the light-emitting unit comprises a blue laser generator and a light guide plate, and the blue laser generator is disposed on a side of the light guide plate, or the light-emitting unit is a blue laser generator.

10. The backlight module according to claim 1, wherein the backlight module further comprises a reflective sheet, and the reflective sheet is disposed on a side of the light-emitting unit away from the laser array.

11. A display device, comprising:
a display module; and
a backlight module disposed on the display module, wherein the backlight module comprises a light-emitting unit, a laser array, a prism sheet, and a diffusion sheet;
wherein the laser array is disposed on the light-emitting unit, and the laser array comprises a red laser generator and a green laser generator, and the red laser generator and the green laser generator comprise an optical echo-wall mode microcavity;
wherein the prism sheet is disposed on the laser array;
wherein the diffusion sheet is disposed on the prism sheet; and
wherein the light emitting unit is configured to emit a blue laser and irradiates the blue laser to the red laser generator and the green laser generator, the red laser generator and the green laser generator excite the red laser and the green laser, and the red laser, the blue laser, and the green laser are mixed by the prism sheet and the diffusion sheet to emit a white laser.

12. The display device according to claim 11, wherein the red laser generator and the green laser generator are disposed alternately, or the red laser generator and the green laser generator are stacked on each other.

13. The display device according to claim 12, wherein the green laser generator is disposed on the red laser generator when the red laser generator and the green laser generator are stacked on each other.

14. The display device according to claim 13, wherein a red laser material and a green laser material are sequentially deposited on a transparent substrate to obtain a two-color laser film by the red laser generator and the green laser generator stacked on each other, and the two-color laser film is formed by etching.

15. The display device according to claim 14, wherein the red laser generator and the green laser generator comprise an organic dye-doped polymer material and an inorganic semiconductor laser material.

16. The display device according to claim 13, wherein the red laser generator and the green laser generator disposed alternately are formed by an inkjet printing.

17. The display device according to claim 16, wherein the red laser generator and the green laser generator comprise a solution-processable organic laser material and a perovskite material.

18. The display device according to claim 11, wherein the red laser generator and the green laser generator comprise a micro-disk optical resonant cavity structure or a micro hemispherical optical resonant cavity structure.

19. The display device according to claim 11, wherein the light-emitting unit comprises a blue laser generator and a light guide plate, and the blue laser generator is disposed on a side of the light guide plate, or the light-emitting unit is a blue laser generator.

20. The display device according to claim 11, wherein the backlight module further comprises a reflective sheet, and the reflective sheet is disposed on a side of the light-emitting unit away from the laser array.

* * * * *